(12) United States Patent
Van Rosmalen et al.

(10) Patent No.: US 6,745,946 B2
(45) Date of Patent: Jun. 8, 2004

(54) DEVICE FOR SCANNING AN ELECTROMAGNETICALLY SUSPENDED INFORMATION CARRIER

(75) Inventors: Gerard Eduard Van Rosmalen, Eindhoven (NL); Josephus Arnoldus Henricus Maria Kahlman, Eindhoven (NL); Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 171 days.

(21) Appl. No.: 10/011,881

(22) Filed: Dec. 4, 2001

(65) Prior Publication Data
US 2002/0074416 A1 Jun. 20, 2002

(30) Foreign Application Priority Data
Dec. 14, 2000 (EP) .............................. 00204509

(51) Int. Cl.$^7$ .............................................. G06K 19/06
(52) U.S. Cl. .................... 235/493; 235/487; 360/48; 360/97.01; 360/98.06; 360/98.07
(58) Field of Search .................... 235/487, 493; 360/48, 97.01, 98.07, 98.08, 99.04

(56) References Cited

U.S. PATENT DOCUMENTS

| | | | | |
|---|---|---|---|---|
| 5,012,359 A | * | 4/1991 | Kohno et al. ................... | 360/71 |
| 5,264,975 A | | 11/1993 | Bajorek et al. .......... | 360/97.01 |
| 5,544,142 A | * | 8/1996 | Funakiri ..................... | 369/75.1 |
| 5,761,016 A | * | 6/1998 | Watanabe ..................... | 360/133 |
| 5,877,922 A | * | 3/1999 | Boutaghou ................ | 360/256.5 |
| 6,021,107 A | * | 2/2000 | Tsukahara et al. ........... | 369/219 |
| 6,049,520 A | * | 4/2000 | Bassett ......................... | 369/266 |
| 6,501,729 B2 | * | 12/2002 | Watanabe et al. ............ | 369/291 |

FOREIGN PATENT DOCUMENTS

| | | | |
|---|---|---|---|
| EP | 0300336 A2 | 7/1988 | ........... G11B/23/00 |
| EP | 0300338 A2 | 1/1989 | ............ B62D/1/10 |

* cited by examiner

Primary Examiner—Michael G. Lee
Assistant Examiner—Steven S. Paik

(57) ABSTRACT

A device for reading and/or writing a disc-shaped information carrier which comprises a support element of a magnetizable material along its circumference. An electromagnetic unit cooperates with the support element and a scanning unit for reading and/or writing the information carrier, which can be rotated about an axis of rotation and positioned with respect to the scanning unit in five degrees of freedom except for the rotational degree around the axis of rotation.

10 Claims, 4 Drawing Sheets

US 6,745,946 B2

DEVICE FOR SCANNING AN ELECTROMAGNETICALLY SUSPENDED INFORMATION CARRIER

BACKGROUND OF THE INVENTION

1. Field of the Invention

The invention relates to a device for scanning a disc-shaped information carrier which is provided, near a circumference, with a support element manufactured from a magnetizable material, which device is provided with an electromagnetic system for co-operating with the support element and with a scanning unit for scanning information present on the information carrier, said information carrier, by co-operation between the electromagnetic system and the support element, being positionable with respect to the scanning unit, rotatable about an axis of rotation directed perpendicularly to the information carrier and displaceable along an X-axis directed perpendicularly to the axis of rotation.

The invention also relates to a disc-shaped information carrier which is provided, near a circumference, with a support element manufactured from a magnetizable material, which support element is used to co-operate with a device in accordance with the invention.

2. Description of the Related Art

A device and a disc-shaped information carrier of the types mentioned in the opening paragraphs are disclosed in EP-A-0 300 336. The known information carrier is provided, along its circumference, with a ring of a ferromagnetic material for co-operating with the electromagnetic system of the known device. The scanning unit of the known device is secured, in a fixed position, to a frame of the device. The scanning unit includes a read and write head by means of which information present on the information carrier can be read or information can be written on the information carrier. The electromagnetic system of the known device comprises two pairs of rows of electromagnets. Viewed in a middle position of the information carrier along the X-axis and viewed in a direction parallel to a Y-axis extending perpendicularly to the axis of rotation and the X-axis, both pairs are arranged diametrically opposite each other, the ferromagnetic ring of the information carrier being situated, in operation, approximately between the two rows of electromagnets of each pair. Furthermore, said ring is situated, in operation, between the electromagnets of eight pairs of electromagnets which are arranged between the two pairs of rows of electromagnets so as to be distributed along the circumference of the information carrier. The electromagnets of said rows and pairs exert, in operation, electromagnetic forces on the ring of the information carrier. The known device further comprises a system of sensors by means of which a position of the information carrier with respect to the frame and the scanning unit can be measured, and the known device further comprises a control unit by means of which the electromagnetic forces can be controlled such that the measured position of the information carrier with respect to the scanning unit substantially corresponds to a desired position. In operation, electromagnetic forces are used to position the information carrier, with respect to the scanning unit, in five degrees of freedom, i.e. in all degrees of freedom except the degree of freedom about the axis of rotation. In operation, the electromagnetic forces are controlled such that the information carrier is rotated about the axis of rotation and simultaneously displaced along the X-axis in such a manner that the scanning unit follows a spiral-shaped information track present on the information carrier. The construction of the known device thus is very simple compared to that of conventional devices for scanning disc-shaped information carriers, which are provided with a rotatable turntable for the information carrier and with a displacement device for displacing and positioning the scanning unit with respect to the rotating information carrier.

A drawback of the known device resides in that the applied electromagnetic system has a large number of electromagnets. As a result, the construction of the electromagnetic system and the necessary control unit are complicated.

SUMMARY OF THE INVENTION

It is an object of the invention to provide a device of the type mentioned in the opening paragraphs, which is provided with an electromagnetic system enabling an information carrier of the type mentioned in the opening paragraphs to be positioned also in five degrees of freedom with respect to the scanning unit, i.e. all degrees of freedom except the degree of freedom about the axis of rotation, but the construction of said electromagnetic system being simplified.

To achieve this object, a device in accordance with the invention is characterized in that the electromagnetic system is provided with a single pair of rows of electromagnets arranged along the X-axis, said rows of electromagnets, viewed in a direction parallel to the axis of rotation, being arranged on either side of the information carrier, and with a first pair of electromagnets and a second pair of electromagnets which, viewed in a middle position of the information carrier along the X-axis and viewed in a direction parallel to a Y-axis extending perpendicularly to the axis of rotation and the X-axis, are arranged substantially diametrically opposite each other, the electromagnets of each pair, viewed in a direction parallel to the X-axis, (Marc, tekst claim 1 wijkt hier af) being arranged on either side of the information carrier, and the magnetic poles of the electromagnets being at substantially the same distances from the axis of rotation (ook hier wijkt tekst af van claim 1) and, in each position of the information carrier along the X-axis, on one side of a magnetic point of application of the support element.

It is to be noted that the expression "magnetic point of application" is to be taken to mean a point at which the electromagnetic force of an electromagnet of the electromagnetic system acts on the support element. As the two pairs are substantially diametrically arranged with respect to each other and the poles of the electromagnets of the two pairs are at substantially equal distances from the X-axis and are situated, in each position of the information carrier along the X-axis, at one side of the magnetic point of application, the electromagnetic forces of the two pairs comprise, in each position of the information carrier along the X-axis, both a component parallel to the axis of rotation and a component along the Y-axis, the components along the Y-axis of the two pairs extending in opposite directions. As the rows of electromagnets extend along the X-axis, in each position of the information carrier along the X-axis, at least one pair of electromagnets of both rows are situated in positions on either side of the magnetic point of application. The electromagnetic forces of the relevant pairs comprise a component extending parallel to the axis of rotation as well as a component extending along the X-axis, the components extending along the X-axis of the electromagnets of each of the relevant pairs extending in opposite directions. The position of the information carrier along the Y-axis can be controlled by controlling said oppositely directed components along the Y-axis of the forces of the first and the second pair by means of a control unit and a system of position sensors. The position of the information carrier along the X-axis can be controlled by controlling said oppositely directed components along the X-axis of the forces of the pair of rows. By controlling said components, directed parallel to the axis of rotation, of the forces of the two pairs and of the pair of rows, both the position of the information carrier parallel to the axis of rotation and the angles of the information carrier about the X-axis and Y-axis can be controlled. As the electromagnetic system comprises only a single pair of rows of electromagnets and two pairs of diametrically arranged electromagnets, the construction of the electromagnetic system is comparatively simple, and the number of electromagnets to be controlled is limited, so that also the necessary control unit is comparatively simple.

A particular embodiment of a device in accordance with the invention is characterized in that the magnetic poles of the electromagnets of the two rows, viewed in a plane wherein the axis of rotation and the X-axis are situated, are arranged in a zigzag pattern. By virtue thereof, it is achieved that, in each position of the information carrier along the X-axis, at least one pair of juxtaposed electromagnets of at least one of the two rows are situated in positions on either side of the magnetic point of application of the support element. Besides, in each position of the information carrier along the X-axis, the largest possible concentration of electromagnets around the support element is achieved. As a result, optimum use is made of the electromagnets of the two rows, and the number of necessary electromagnets of the two rows is limited.

A further embodiment of a device in accordance with the invention is characterized in that the magnetic poles of the electromagnets of the first and the second pair are situated, in each position of the information carrier along the X-axis, at a larger distance from the X-axis than the magnetic point of application of the support element. By virtue thereof, it is achieved that the magnetic poles of the electromagnets of the two pairs are situated, taking the average of all positions of the information carrier along the X-axis, at a comparatively small distance, parallel to the Y-axis, from the magnetic point of application. As a result, the components directed parallel to the axis of rotation of the electromagnetic forces of the electromagnets of the two pairs, taking the average of all positions of the information carrier along the X-axis, are comparatively large, so that these electromagnets exert a comparatively large supporting force on the information carrier in a direction parallel to the axis of rotation.

Yet another embodiment of a device in accordance with the invention is characterized in that the electromagnets of the first and the second pair are each provided with a U-shaped core and an electric coil wound about a core base extending substantially parallel to the X-axis, the magnetic poles being formed by end portions of two legs of the core, which legs extend substantially parallel to the axis of rotation and are directed towards the other electromagnet of the relevant pair. As said base of the core extends parallel to the X-axis, the two magnetic poles of the electromagnets of each pair are situated at substantially equal distances from the X-axis. As a result, it is achieved that, in each position of the information carrier along the X-axis, the two magnetic poles are situated at the smallest possible distance from the magnetic point of application of the support element, so that the supporting force exerted by the electromagnets of the two pairs on the information carrier in a direction parallel to the axis of rotation is as large as possible.

A particular embodiment of a device in accordance with the invention is characterized in that the electromagnets of each row are provided with a U-shaped core and an electric coil wound about a core base extending substantially parallel to the Y-axis, the magnetic poles being formed by end portions of two legs of the core, which legs extend substantially parallel to the axis of rotation and are directed towards the other row. As said base of the core extends parallel to the Y-axis, the two magnetic poles of the electromagnets of each row are situated at substantially equal distances from the Y-axis. By virtue thereof, it is achieved that the two magnetic poles are situated, in each position of the information carrier along the X-axis, at the smallest possible distance from the magnetic point of application of the support element, as a result of which the supporting force exerted by the electromagnets of the two rows on the information carrier in a direction parallel to the axis of rotation is as large as possible.

A further embodiment of a device in accordance with the invention is characterized in that between the first pair and the second pair of electromagnets, there is a distance which is larger than approximately 4 mm and smaller than approximately 40 mm.

A disc-shaped information carrier in accordance with the invention, which can suitably be used to co-operate with the above-mentioned further embodiment of a device in accordance with the invention is characterized in that the information carrier has a diameter which is larger than approximately 4 mm and smaller than approximately 40 mm.

Apart from the scanning unit, the device in accordance with the invention, in principle, only comprises the electromagnetic system and the necessary control unit, as a result of which the device can very suitably be miniaturized. In said further embodiment, the necessary dimensions of the device are limited such that the device can suitably be provided in very small spaces, such as comparatively small pockets in articles of clothing or bags. It has been found that, at a diameter of the information carrier above approximately 4 mm and below approximately 40 mm, a particularly stable support of the information carrier by means of the electromagnetic system of the device in accordance with the invention is achieved.

A still further embodiment of a device in accordance with the invention is characterized in that the device can suitably be used for scanning a disc-shaped information carrier whose support element, viewed in a radial direction with respect to the axis of rotation, has a width which varies in the circumferential direction between a minimum value and a maximum value, a substantially constant pitch being present between successive positions where the width has said maximum value, in which device the magnetic poles of at least one electromagnet of at least one of the two pairs or the magnetic poles of each electromagnet of at least one of the two rows are mutually arranged in a substantially tangential direction with respect to the axis of rotation, a pitch which is substantially equal to said pitch of the support element being present between said magnetic poles.

A disc-shaped information carrier in accordance with the invention, which can suitably be used to co-operate with the above-mentioned still further embodiment of a device in accordance with the invention is characterized in that the support element, viewed in a radial direction with respect to the axis of rotation, has a width which varies in the circumferential direction between a minimum value and a maximum value, a substantially constant pitch being present between successive positions where the width has said maximum value.

As the pitch between said magnetic poles is substantially equal to said pitch of the support element, said magnetic poles are capable of exerting an electromagnetic force on the support element, in a substantial part of all possible angular positions of the information carrier about the axis of rotation, which electromagnetic force includes a component in said tangential direction. Under the influence of said component of the electromagnet force, the information carrier is rotated about the axis of rotation. A continuous rotation of the information carrier about the axis of rotation at a desired speed of rotation is achieved by controlling said electromagnets in a suitable manner by means of the control unit.

A particular embodiment of a disc-shaped information carrier in accordance with the invention is characterized in that the support element has at least one undulated edge. As the support element has an undulated edge, it is achieved, in a practical manner, that the support element, viewed in a radial direction with respect to the axis of rotation, has a width which varies in the circumferential direction between a minimum value and a maximum value.

These and other aspects of the invention will be apparent from and elucidated with reference to the embodiment(s) described hereinafter.

DETAILED DESCRIPTION OF THE INVENTION

Figure 1:
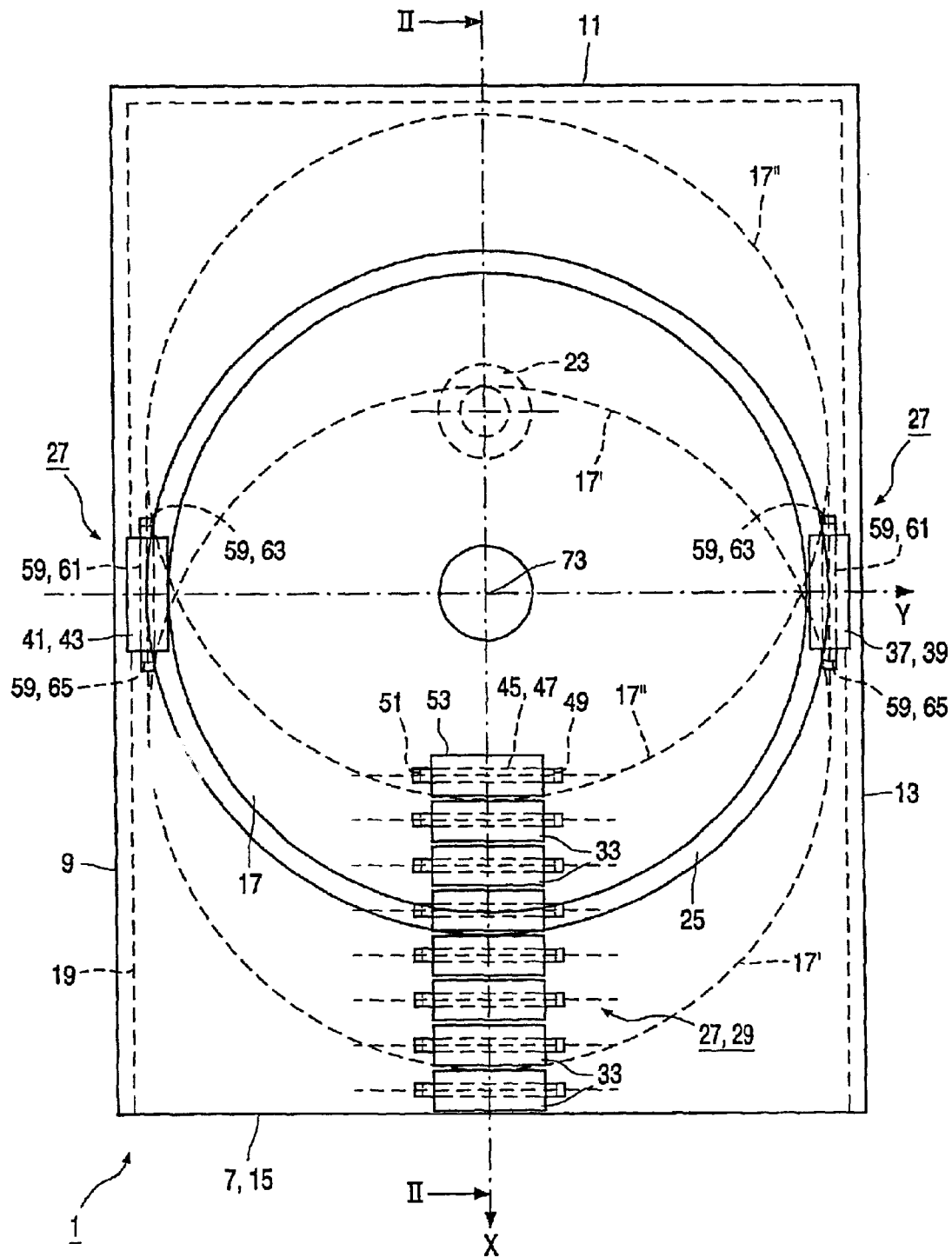
FIG. 1 is a diagrammatic, plan view of a device in accordance with the invention wherein a disc-shaped information carrier in accordance with the invention is provided.
Figure 2:
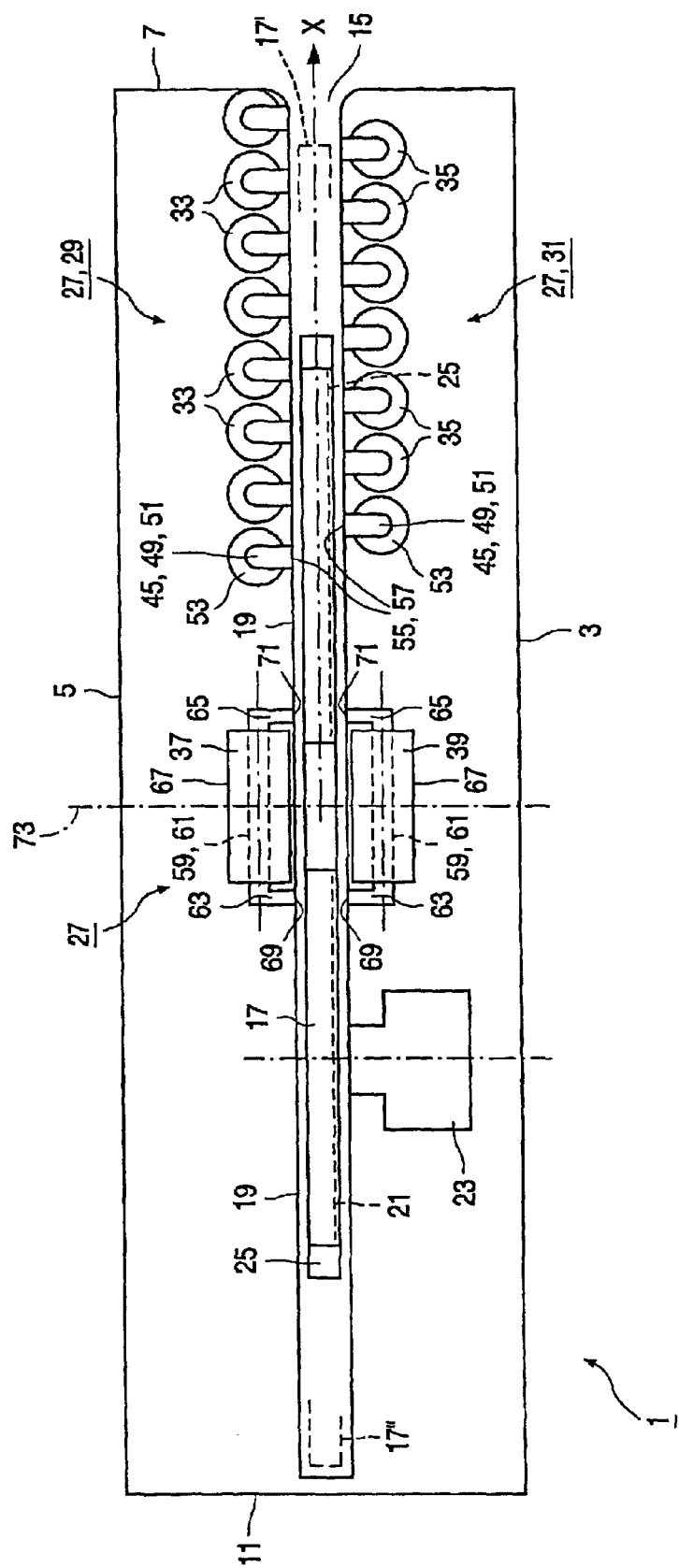
FIG. 2 is a diagrammatic, cross-sectional view taken on the line II—II in FIG. 1, FIG. 3 diagrammatically shows the co-operation between two pairs of electromagnets of the device shown in FIG. 1 and a support element of the information carrier shown in FIG. 1, FIG. 4 diagrammatically shows the co-operation between two rows of electromagnets of the device shown in FIG. 1 and a support element of the information carrier shown in FIG. 1, and FIG. 5 diagrammatically shows a part of a support element of the information carrier shown in FIG. 1.

The device in accordance with the invention, as diagrammatically shown in FIG. 1 and FIG. 2, comprises a housing 1 which is predominantly provided with two parallel main walls 3 and 5 and side walls 7, 9, 11 and 13 extending perpendicularly thereto. The side wall 7 is provided with a slit-shaped input opening 15 via which a disc-shaped information carrier 17 in accordance with the invention can be introduced into an input space 19 of the device. In the example shown, the information carrier 17 is an optically scannable information carrier provided with an information layer 21 on which a spiral-shaped information track is present. In this example, the device is provided with an optical scanning unit 23 of a type which is known per se and commonly used, which scanning unit is only diagrammatically shown in the drawings, for the sake of simplicity, and can suitably be used for reading and/or writing the information carrier 17 in a manner known from, for example, CDs or DVDs. It is to be noted, however, that the invention also comprises embodiments wherein the information carrier can be scanned in a different manner, for example magnetically or magneto-optically, and wherein the device is provided with a scanning unit suitable for this purpose. The scanning unit 23 is arranged in a fixed position in the housing 1.

As is further shown in FIG. 1 and FIG. 2, the information carrier 17 is provided, near a circumference, with a support element 25 of a magnetizable material, which support element is embodied, in the example shown, so as to be an iron ring. The device is provided with an electromagnet system 27 for co-operating with the support element 25. The electromagnetic system 27 comprises two rows 29, 31 of electromagnets 33, 35, a first pair of electromagnets 37, 39 and a second pair of the electromagnets 41, 43. As shown in FIG. 2, the rows 29, 31 are arranged in a fixed position on either side of the input space 19 and the information carrier 17 in the housing 1, the two rows 29, 31, as shown in FIG. 1, extending directly along an X-axis which extends substantially along a centerline of the information carrier 17. As shown in FIG. 1, the first pair of electromagnets 37, 39 and the second pair of electromagnets 41, 43 are arranged substantially diametrically with respect to each other, viewed in a middle position of the information carrier 17 along the X-axis and viewed in a direction parallel to a Y-axis extending perpendicularly to the X-axis and extending, in said middle position, also substantially along a centerline of the information carrier 17. As shown in FIG. 2, the electromagnets 37 and 39, as well as the electromagnets 41 and 43, are arranged in a fixed position in the housing 1 on either side of the input space 19 and the information carrier 17. As FIG. 1 and FIG. 2 jointly show, the electromagnets 33, 35 of the two rows 29, 31 are each provided with a U-shaped core 45 having a base 47 extending substantially parallel to the Y-axis and two legs 49, 51 extending substantially perpendicularly to the X-axis and perpendicularly to the Y-axis and facing the input space 19 and the information carrier 17. An electric coil 53 is wound around the base 47, while the end portions of the two legs 49, 51 form magnetic poles 55, 57 of the relevant electromagnet 33, 35. Similarly, the electromagnets 37, 39, 41, 43 of the two pairs are each provided with a U-shaped core 59 having a base 61 extending substantially parallel to the X-axis and two legs 63, 65 extending substantially perpendicularly to the X-axis and perpendicularly to the Y-axis and facing the input space 19 and the information carrier 17. An electric coil 67 is wound around the base 61, while the end portions of the two legs 63, 65 form magnetic poles 69, 71 of the relevant electromagnet 37, 39, 41, 43. By co-operation between the electromagnetic system 27 and the support element 25 of the information carrier 17 in a manner which will be described in more detail hereinbelow, the information carrier 17 is rotated, in operation, with respect to the scanning unit 23 about an axis of rotation 73 extending substantially perpendicularly to the X-axis and substantially perpendicularly to the Y-axis, and said information carrier is positioned, with respect to the scanning unit 23, in five degrees of freedom, i.e. in all degrees of freedom except the degree of freedom about the axis of rotation 73, said information carrier 17 being displaceable over comparatively large distances along the X-axis between a first extreme position 17' and a second extreme position 17" indicated by means of dashed lines in FIG. 1 and FIG. 2.

Figure 3:
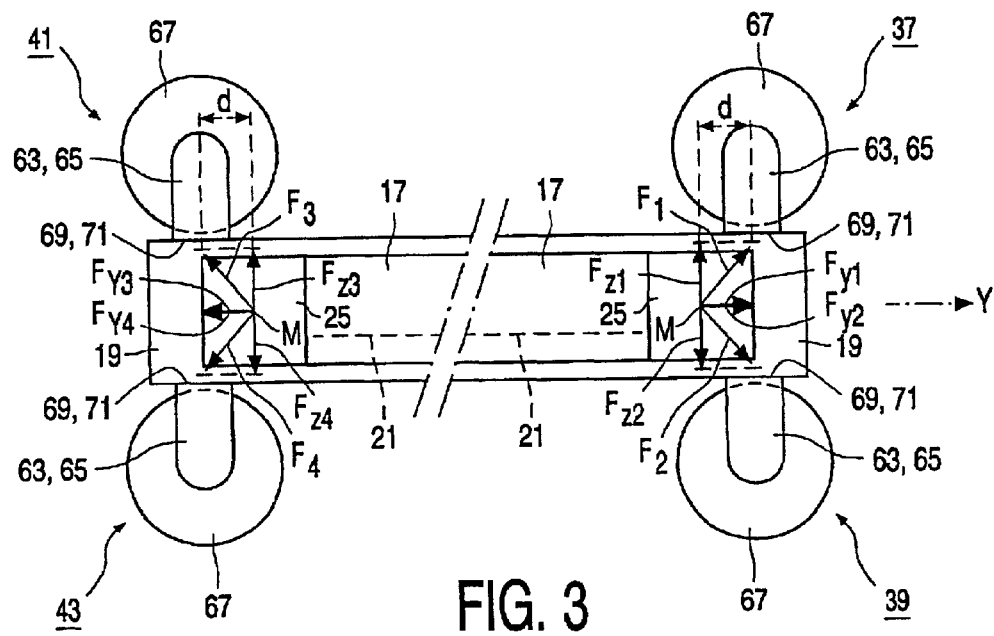
Figure 4:
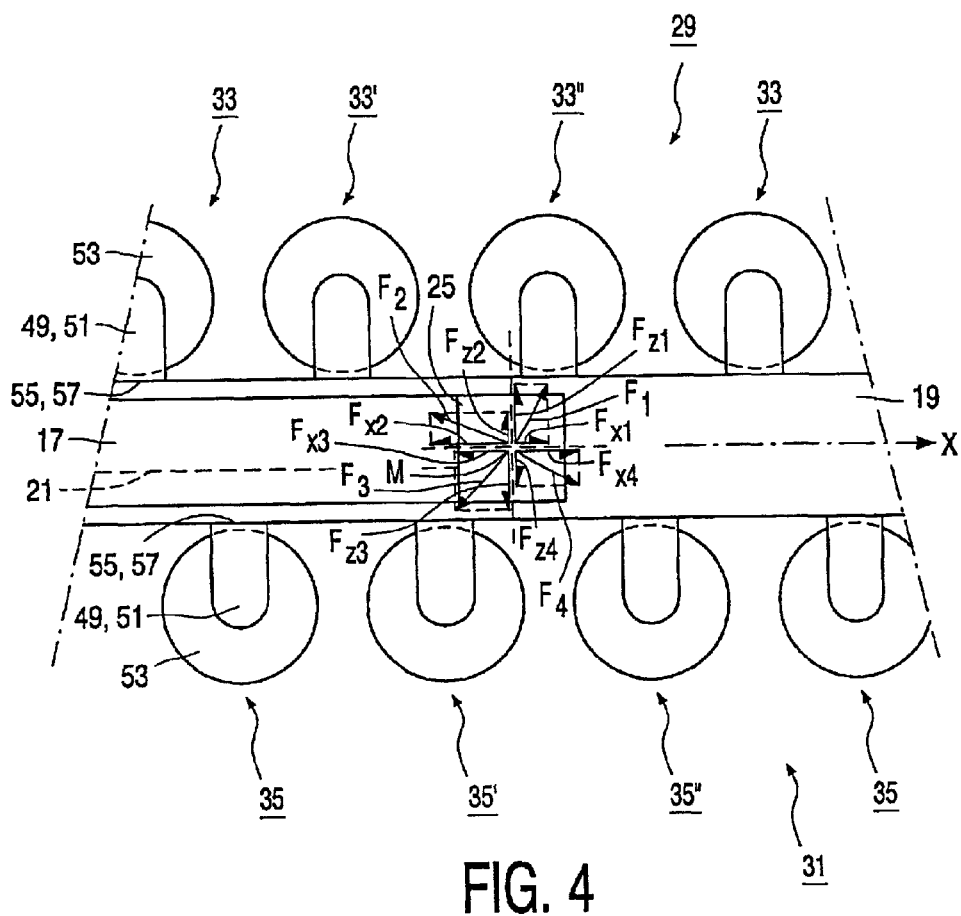

The co-operation between the electromagnetic system 27 and the support element 25 will be explained hereinbelow with reference to FIG. 3 and FIG. 4. If an electromagnet 33, 35, 37, 39, 41, 43 of the electromagnetic system 27 is energized, in operation, by means of an electric current through the coil 53, 67, then the relevant electromagnet 33, 35, 37, 39, 41, 43 exerts an attractive electromagnetic force on the support element 25. Hereinbelow, the expression "magnetic point of application" is to be taken to mean a point where the electromagnetic force of an electromagnet acts on the support element 25. In FIG. 3 and FIG. 4, this magnetic point of application is always indicated by means of the letter M. As shown in FIG. 1 and FIG. 3, the magnetic poles 69, 71 of the electromagnets 37, 39, 41, 43 are situated at substantially equal distances from the X-axis. The magnetic poles 69, 71 are situated at a slightly larger distance from the X-axis than the magnetic points of application M, so that there is a comparatively small distance d between the magnetic poles 69, 71 and the magnetic points of application M, viewed in a direction parallel to the Y-axis. As the information carrier 17 is shown in the middle position in FIG. 1 and FIG. 3, said distance is larger than d in any other position of the information carrier 17 along the X-axis between the two extreme positions 17' and 17". Thus, in any position of the information carrier 17 along the X-axis, the magnetic poles 69, 71 are situated on one side of the magnetic points of application M and at a larger distance from the X-axis than the magnetic points of application M. As a result, the electromagnetic forces of the electromagnets 37, 39, 41, 43, referenced $F_1$, $F_2$, $F_3$ and $F_4$ in FIG. 3, have, in any position of the information carrier 17 along the X-axis, both a component $F_Z$ parallel to the axis of rotation 73 and a component $F_Y$ along the Y-axis, the direction of the components $F_Y$ of the electromagnets 37, 39 being in opposition to the direction of the components $F_Y$ of the electromagnets 41, 43. As said components $F_Y$ extend in opposite directions, the information carrier 17 can be positioned in two opposite directions along the Y-axis with respect to the scanning unit 23 by controlling the electromagnetic forces $F_1$, $F_2$, $F_3$ and $F_4$ in a manner described hereinbelow. As the base 61 of the core 59 of the electromagnets 37, 39, 41, 43 extends parallel to the X-axis, the two magnetic poles 69, 71 are at substantially equal distances from the X-axis. By virtue thereof, it is achieved that an average distance between the magnetic poles 69, 71 and the magnetic point of application M is as small as possible, taking the average of all possible positions of the information carrier 17 along the X-axis, as a result of which the electromagnetic forces $F_1$, $F_2$, $F_3$ and $F_4$ are as large as possible. It is to be noted that the invention also includes embodiments wherein the magnetic poles 69, 71 of the electromagnets 37, 39, 41, 43 of the two pairs are situated, in each position of the information carrier 17 along the X-axis, at a smaller distance from the X-axis than the magnetic point of application M of the support element 25. In such embodiments, the direction of the components of the electromagnetic forces $F_1$, $F_2$, which components are directed along the Y-axis, is also in opposition to the direction of the components of the electromagnetic forces $F_3$, $F_4$, which components are directed along the Y-axis. In such embodiments, however, the magnetic poles 69, 71 are situated, taking the average of all possible positions of the information carrier 17 along the X-axis, at a larger distance from the magnetic point of application M than in the embodiment shown in FIG. 1 and FIG. 2. Therefore, in the embodiment shown in FIG. 1 and FIG. 2, on average, larger electric forces $F_1$, $F_2$, $F_3$ and $F_4$ can be generated.

As is further shown in FIG. 2, the magnetic poles 55, 57 of the electromagnets 33 of the row 29, and the magnetic poles 55, 57 of the electromagnets 35 of the row 31 are arranged in a zigzag pattern with respect to each other, viewed in a plane wherein the X-axis and the axis of rotation 73 are situated. By virtue thereof it is achieved that, in each position of the information carrier along the X-axis, at least one pair of juxtaposed electromagnets 33, 35 of at least one of the two rows 29, 31 are in positions on either side of the magnetic point of application M of the support element 25. In the situation shown in detail in FIG. 4, this applies to the juxtaposed electromagnets 33" and 33" of the row 29 and the juxtaposed electromagnets 35' and 35" of the row 31. The electromagnetic forces of the electromagnets 33' and 33", referenced $F_1$ and $F_2$ in FIG. 4, comprise a component $F_Z$ parallel to the axis of rotation 73 as well as a component $F_X$ along the X-axis, the direction of the component $F_X$ of the electromagnet 33' being in opposition to the direction of the component $F_X$ of the electromagnet 33". Similarly, the electromagnetic forces of the electromagnets 35' and 35", referenced $F_3$ and $F_4$ in FIG. 4, comprise a component $F_Z$ parallel to the axis of rotation 73 as well as a component $F_X$ along the X-axis, the direction of the component $F_X$ of the electromagnet 35' being in opposition to the direction of the component $F_X$ of the electromagnet 35". As said components $F_X$ extend in opposite directions, the information carrier 17 can be displaced in two opposite directions along the X-axis and positioned with respect to the scanning unit 23 by controlling the electromagnetic forces $F_1$, $F_2$, $F_3$ and $F_4$ in a manner described hereinbelow. In a situation where the magnetic poles 55, 57 of one of the electromagnets 33 of the row 29 or of one of the electromagnets 35 of the row 31 are situated straight opposite the magnetic point of application M, only two juxtaposed electromagnets 35 of the row 31, or two juxtaposed electromagnets 33 of the row 29, are situated in positions on either side of the magnetic point of application M. In this situation, only the oppositely directed components $F_X$ of said two electromagnets, which are situated on either side of the magnetic point of application M, are available for displacing and positioning the information carrier 17 in two opposite directions along the X-axis. As, in each position of the information carrier 17 along the X-axis, at least one pair of juxtaposed electromagnets 33, 35 of at least one of the two rows 29, 31 are situated in positions on either side of the magnetic point of application M of the support element 25, and as the two rows 29, 31 of electromagnets 33, 35, as shown in FIG. 1 and FIG. 2, extend along the X-axis beyond the two extreme positions 17' and 17" of the information carrier 17, said information carrier 17 can be displaced along the X-axis between the two extreme positions 17' and 17", and the information carrier can be positioned in each position between the two extreme positions 17' and 17" by suitably energizing, in each position of the information carrier 17, the juxtaposed electromagnets 33, 35 of at least one of the two rows 29, 31 situated on either side of the magnetic point of application M in the relevant position of the information carrier 17. As the base 47 of the core 45 of the electromagnets 33, 35 extends in a direction parallel to the Y-axis, it is achieved that an average distance between the magnetic point of application M and the magnetic poles 55, 57 of the electromagnets 33', 33", 35', 35" is as small as possible, as a result of which the electromagnetic forces $F_1$, $F_2$, $F_3$ and $F_4$ are as large as possible. It is to be noted that apart from embodiments wherein the magnetic poles 55, 57 of the electromagnets 33, 35 are arranged in a zigzag pattern, the invention also comprises embodiments wherein the magnetic poles 55, 57 of the electromagnets 33 are arranged directly opposite the magnetic poles 55, 57 of the electromagnets 35. In such embodiments, in each position of the information carrier 17 along the X-axis, at least one pair of electromagnets 33, 35 of each row 29, 31 is in positions on either side of the magnetic point of application M, so that the relevant pairs of electromagnets can also be used to generate electromagnetic forces with oppositely directed components $F_X$. In such embodiments, however, the relevant pairs do not always form pairs of juxtaposed electromagnets, particularly when the information carrier 17 is in a position where the magnetic point of application M is right opposite one of the electromagnets 33, 35 of each row 29, 31. In such a position, the components $F_X$ should be supplied by the two adjoining electromagnets 33 and the two adjoining electromagnets 35 which in this position are situated, however, at a comparatively large distance from the point of application M. In the example shown in FIG. 1 and FIG. 2, in each position of the information carrier 17 along the X-axis, at least one pair of juxtaposed electromagnets 33, 35 of at least one of the rows 29, 31 is at a comparatively small distance from the magnetic point of application M, so that, in this example, better use is made of the electromagnets 33, 35 of the two rows 29, 31.

The device in accordance with the invention further comprises a system of sensors by means of which a position of the information carrier 17, in operation, with respect to the scanning unit 23 can be measured. Said position is determined by linear positions of the information carrier 17 in directions parallel to the X-axis, parallel to the Y-axis and parallel to the axis of rotation 73, and by angular positions of the information carrier 17 about the X-axis and the Y-axis. For the sake of simplicity, said system of sensors is not shown in the drawings and comprises, in the example shown of the device, a system of optical position sensors. Said system of sensors may alternatively comprise, however, another type of sensors or a combination of other sensor types, such as magnetic sensors for co-operation with the support element 25. The device further includes an electric control unit, not shown either in the Figures, by means of which the electric currents through the electromagnets 33, 35, 37, 39, 41, 43 of the electromagnetic system 27, and hence the electromagnetic forces of the electromagnets 33, 35, 37, 39, 41, 43, can be controlled. In operation, the control unit compares the linear positions and angular positions of the information carrier 17 measured by means of the system of sensors with the desired linear and angular positions derived, by the control unit, from a contol program for the information carrier 17 stored in the control unit. The control unit controls said electric currents and hence said electromagnetic forces, in such a manner that said measured linear positions and angular positions correspond, within predetermined comparatively small limits, to said desired linear and angular positions. A desired linear position of the information carrier 17 along the X-axis is achieved by controlling the above-mentioned electromagnetic forces, in particular the components $F_X$, directed along the X-axis, of the electromagnets 33, 35 of the two rows 29, 31. A desired linear position of the information carrier 17 parallel to the Y-axis is achieved by controlling the above-mentioned electromagnetic forces, in particular the components $F_Y$, directed along the Y-axis, of the electromagnets 37, 39, 41, 43 of the two pairs. A desired liner position of the information carrier 17 parallel to the axis of rotation 73, a desired angular position of the information carrier 17 about the X-axis, and a desired angular position of the information carrier 17 about the Y-axis are achieved by controlling the electromagnetic forces, in particular the components $F_X$, directed parallel to the axis of rotation 73, of both the electromagnets 33, 35 of the two rows 29, 31 and the electromagnets 37, 39, 41, 43 of the two pairs.

Figure 5:
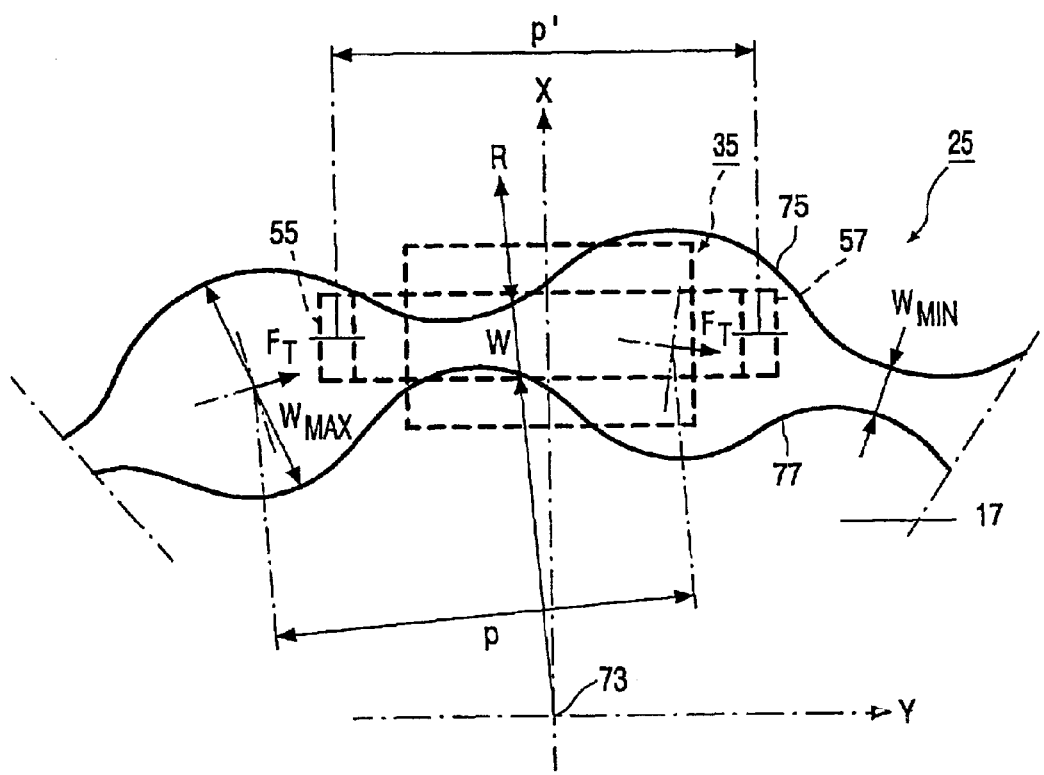

A rotation of the information carrier 17 about the axis of rotation 73, in operation, is achieved in the following manner. As is diagrammatically shown in FIG. 5, the support element 25 of the information carrier 17, viewed in a radial direction R with respect to the axis of rotation 73, has a width W which, viewed in a circumferential direction of the information carrier 17, ranges between a minimum value $W_{MIN}$ and a maximum value $W_{MAX}$, a substantially constant pitch p being present between successive locations on the support element 25, where the width W has the maximum value $W_{MAX}$. In the example shown in FIG. 5, such a varying width W of the support element 25 is achieved in a practical manner in that the support element 25 is provided with two undulated edges 75 and 77. It is to be noted, however, that the invention also comprises embodiments of an information carrier wherein such a variable width of the support element 25 is achieved in a different manner, such as by means of a support element having a single undulated edge, a support element having at least one block-shaped edge, or a support element having at least one sawtooth-shaped edge. In the case of such a sawtooth shape, the flanks of the sawtooth shape are advantageously alternately provided with a comparatively large length and a comparatively small length. Moreover, such a variable width of the support element 25 can also be achieved, for example, by means of a ring-shaped support element wherein indentations are provided at regular intervals. It is to be noted that the undulated edges 75, 77 of the support element 25 are not shown in the other Figures, for the sake of simplicity. FIG. 5 also shows one of the electromagnets 35 of the row 31, which, in the position shown of the information carrier 17 along the X-axis, is situated approximately opposite the support elements 25. A pitch p' which is substantially equal to said pitch p of the support element 25 is present between the magnetic poles 55 and 57 of the relevant electromagnet 35, as well as between the magnetic poles 55 and 57 of the other electromagnets 35 of the row 31, and between the magnetic poles 55 and 57 of each one of the electromagnets 33 of the row 29. As said pitches p and p' are substantially equal, the electromagnet 35 shown exerts, in a substantial part of the possible angular positions of the information carrier 17 about the axis of rotation 73, substantially equally large attractive electromagnetic forces on the parts of the support element 25 near the poles 55 and 57, where the width W has the maximum value $W_{MAX}$. In FIG. 5, the tangential components $F_T$, with respect to the axis of rotation 73, of said electromagnetic forces are shown. The above-mentioned control unit of the device controls said electromagnetic forces, in particular the tangential components $F_T$, of the electromagnets 33, 35 of the two rows 29, 31 in such a manner that an angular velocity of the information carrier 17 about the axis of rotation 73, which is measured by means of said system of sensors, is substantially equal to a desired angular velocity derived by the control unit from said control program. In accordance with the control program, the angular velocity with which the information carrier 17 is rotated about the axis of rotation 73 and, simultaneously, the way in which said information carrier is displaced along the X-axis, are such that the scanning unit 23 follows a spiral-shaped information track present on the information layer 21. It is to be noted that the invention also comprises embodiments wherein only the electromagnets 33, 35 of one of the two rows 29, 31 have a pitch p' between the magnetic poles 55, 57 which corresponds to the pitch p of the support element 25. In such an embodiment only the electromagnets 33, 35 of the relevant row 29, 31 are used to rotate the information carrier 17 about the axis of rotation 73. The invention further comprises embodiments wherein at least one of the electromagnets 37, 39, 41, 43 of the two pairs has a pitch p' between the magnetic poles 69, 71 which corresponds to the pitch p of the support element 25, and hence is used for rotating the information carrier 17 about the axis of rotation 73. The invention also comprises embodiments wherein all electromagnets 33, 35, 37, 39, 41, 43 of the electromagnetic system 27 have such a pitch p' between the magnetic poles 55, 57, 69, 71 and hence are all used for rotating the information carrier 17. As said pitches p and p' are equally large, said tangential components $F_T$ are comparatively large. It is to be noted that a rotation of the information carrier 17 about the axis of rotation 73 by means of the electromagnetic system 27 can also be generated if said pitch p is much larger than said pitch p'. In general, a rotation of the information carrier 17 about the axis of rotation 73 can be generated by means of the electr4omagnetic system 27 if the magnetic properties of the support element 25 are inhomogeneous, viewed in the circumferential direction. For example, instead of an inhomogeneous width of the support element 25, as in the previously described example, said support element may have a thickness which varies in the circumferential direction.

In the example shown of the device in accordance with the invention, the control unit also receives a focusing-error signal and a tracking-error signal from the optical scanning unit 23, which signals are generated by the optical scanning unit 23 in a manner which is known per se and customary, by means of an optical detector present in the scanning unit. The control unit also controls the electromagnetic forces of the electromagnets 33, 35, 37, 39, 41, 43 in such a manner that said focusing error signal and said tracking error signal remain within predetermined limiting values. As a result, the device in accordance with the invention does not have to comprise a separate actuator for correcting said errors by means of comparatively small displacements of the scanning unit 23. By virtue thereof, the construction of the device in accordance with the invention is very simple and does not comprise movable parts. As the electromagnetic system 27 of the device in accordance with the invention comprises only a single pair of rows 29, 31 of electromagnets 33, 35 and only two pairs of diametrically arranged electromagnets 37, 39, 41, 43, the construction of the electromagnetic system 37 is comparatively simple. In addition, the number of electromagnets to be controlled by the control unit is limited, so that also the control unit is comparatively simple. By virtue of the comparatively simple construction of the device, said device is particularly suitable for miniaturization. It has been found that a very stable support of the information carrier 17 by means of the electromagnetic system 27 is achieved if the information carrier 17 has a diameter above approximately 4 mm and below approximately 40 mm. In this case, also the distance between the pair of electromagnets 37, 39 and the pair of electromagnets 41, 43 is larger than only approximately 4 mm and smaller than only approximately 40 mm. The high degree of stability is obtained in that, at such dimensions, the natural frequencies of the information carrier 17 are far beyond the necessary control bandwidth. In such an embodiment, the necessary dimensions of the housing 1 of the device are limited such as to enable the device to be suitably placed in very small spaces, such as comparatively small pockets in articles of clothing or bags. At such dimensions, the information carrier 17 has a relatively small mass, as a result of which the necessary electromagnetic forces are also comparatively small. It has been found that, at a diameter of the information carrier 17 in excess of 15 mm and below 25 mm, an optimum ratio between the control stability, the necessary electromagnetic forces, and the information surface area available on the information carrier 17 is obtained.

It is to be noted that instead of the above-mentioned ring-shaped support element 25, a disc-shaped information carrier in accordance with the invention can alternatively be provided with a different support element near its circumference. An example of such a different support element is a support element comprising a comparatively small number of ring segments manufactured from a magnetizable material, or a support element comprising a comparatively large number of separate elements manufactured from a magnetizable material which are regularly spaced along the circumference of the information carrier.

Finally, it is to be noted that instead of the above-mentioned electromagnetic system 27, a device in accordance with the invention may alternatively be provided with a different electromagnetic system which, apart from the single pair of rows 29, 31 of electromagnets 33, 35 arranged along the X-axis, is also provided with more than two pairs of diametrically arranged electromagnets. An example of such a different electromagnet system is an electromagnetic system which, in addition to the single pair of rows 29, 31 of electromagnets 33, 35 arranged along the X-axis, is provided with a first and a second pair of electromagnets and with a third and a fourth pair of electromagnets which, viewed along the Y-axis, are diametrically arranged with respect to the first and the second pair, said first and second pair, like the third and fourth pair, viewed along the Y-axis, being arranged next to each other, or the first and the second pair, like the third and the fourth pair, viewed parallel to the X-axis, being arranged one behind the other.

What is claimed is:

1. A device for scanning a disc-shaped information carrier which is provided, near a circumference, with a support element manufactured from a magnetizable material, which device is provided with an electromagnetic system for co-operating with the support element and with a scanning unit for scanning information present on the information carrier, said information carrier, by co-operation between the electromagnetic system and the support element, being positioned with respect to the scanning unit, rotating about an axis of rotation directed perpendicularly to the information carrier and displaced along an X-axis directed perpendicularly to the axis of rotation, wherein the electromagnetic system is provided with no more than a single pair of rows of electromagnets arranged along the X-axis, said rows of electromagnets, viewed in a direction parallel to the axis of rotation, being arranged on either side of the information carrier, and with a first pair of electromagnets and a second pair of electromagnets which, viewed in a middle position of the information carrier along the X-axis and viewed in a direction parallel to a Y-axis extending perpendicularly to the axis of rotation and the X-axis, are arranged substantially diametrically opposite each other, the electromagnets of each pair, viewed in a direction parallel to the axis of rotation, being arranged on either side of the information carrier, and the magnetic poles of the electromagnets being at substantially the same distance from the X-axis and, in each position of the information carrier along the X-axis, on one side of a magnetic point of application of the support element.

2. A device as claimed in claim 1, characterized in that the magnetic poles of the electromagnets of the two rows, viewed in a plane wherein the axis of rotation and the X-axis are situated, are arranged in a zigzag system.

3. A device as claimed in claim 1, characterized in that the magnetic poles of the electromagnets of the first and the second pair are situated, in each position of the information carrier along the X-axis, at a larger distance from the X-axis than the magnetic point of application of the support element.

4. A device as claimed in claim 1, characterized in that the electromagnets of the first and second pair are each provided with a U-shaped core and an electric coil wound about a core base extending substantially parallel to the X-axis, the magnetic poles being formed by end portions of two legs of the core, which legs extend substantially parallel to the axis of rotation and are directed towards the other electromagnet of the relevant pair.

5. A device as claimed in claim 1, characterized in that the electromagnets of each row are provided with a U-shaped core and an electric coil wound about a core base extending substantially parallel to the Y-axis, the magnetic poles being formed by end portions of two legs of the core, which legs extend substantially parallel to the axis of rotation and are directed towards the other row.

6. A device as claimed in claim 1, characterized in that between the first pair and the second pair of electromagnets, there is a distance which is larger than approximately 4 mm and smaller than approximately 40 mm.

7. A device for scanning a disc-shaped information carrier which is provided, near a circumference, with a support element manufactured from a magnetizable material, which device is provided with an electromagnetic system for co-operating with the support element and with a scanning unit for scanning information present on the information carrier, said information carrier, by co-operation between the electromagnetic system and the support element, being positioned with respect to the scanning unit, rotating about an axis of rotation directed perpendicularly to the information carrier and displaced alone an X-axis directed perpendicularly to the axis of rotation, characterized in that the electromagnetic system is provided with a single pair of rows of electromagnets arranged along the X-axis, said rows of electromagnets, viewed in a direction parallel to the axis of rotation, being arranged on either side of the information carrier, and with a first pair of electromagnets and a second pair of electromagnets which, viewed in a middle position of the information carrier along the X-axis and viewed in a direction parallel to a Y-axis extending perpendicularly to the axis of rotation and the X-axis, are arranged substantially diametrically opposite each other, the electromagnets of each pair, viewed in a direction parallel to the axis of rotation, being arranged on either side of the information carrier, and the magnetic poles of the electromagnets being at substantially the same distance from the X-axis and, in each position of the information carrier along the X-axis, on one side of a magnetic point of application of the support element wherein when the device scans a disc-shaped information carrier whose support element, the device as viewed in a radial direction with respect to the axis of rotation, has a width which varies in the circumferential direction between a minimum value and a maximum value, and a substantially constant pitch exists between successive positions where the width has said maximum value, in which device the magnetic poles of at least in each electromagnet of at least one of the two rows are mutually arranged in a substantially tangential direction with respect to the axis of rotation, a pitch which is substantially equal to said pitch of the support element being present between said magnetic poles.

8. A device as claimed in claim 7, wherein the disc-shaped information carrier has a diameter above approximately 4 mm and below approximately 40 mm.

9. A device as claimed in claim 7, wherein the support element; viewed in a radial direction with respect to the axis of rotation, has a width which varies in the circumferential direction between a minimum value and a maximum value, the pitch being substantially constant between successive positions where the width has said maximum value.

10. A disc-shaped information carrier as claimed in claim 9, characterized in that the support element has at least one undulated page.

* * * * *